(12) United States Patent
Hsieh et al.

(10) Patent No.: US 7,758,000 B2
(45) Date of Patent: Jul. 20, 2010

(54) MONITOR AND SUPPORTING MECHANISM FOR THE SAME

(75) Inventors: Fang-Keng Hsieh, Taipei Hsien (TW); Jin-Wei Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 10 days.

(21) Appl. No.: 12/241,070

(22) Filed: Sep. 30, 2008

(65) Prior Publication Data
US 2010/0027198 A1    Feb. 4, 2010

(30) Foreign Application Priority Data
Jul. 31, 2008   (CN) .................. 2008 1 0303268

(51) Int. Cl.
*F16M 11/00* (2006.01)

(52) U.S. Cl. .................. 248/176.1; 248/917; 248/919; 248/923; 361/679.02

(58) Field of Classification Search .................. 248/917, 248/919, 923, 176.1; 361/679.02
See application file for complete search history.

(56) References Cited

U.S. PATENT DOCUMENTS

| 7,006,853 | B2 * | 2/2006 | Kang et al. | 455/575.3 |
| 7,130,186 | B2 * | 10/2006 | Yu | 361/679.27 |
| 7,251,126 | B2 * | 7/2007 | Stephany et al. | 361/679.27 |
| 2005/0141181 | A1 * | 6/2005 | Stephany et al. | 361/681 |

\* cited by examiner

*Primary Examiner*—Amy J Sterling
(74) *Attorney, Agent, or Firm*—Frank R. Niranjan

(57) ABSTRACT

A monitor includes a base member, a rotatable portion, a monitor body, and a screw. The base member has a mounting end. The rotatable portion is assembled on the mounting end and defines a latching slot and a screw hole communicating with the latching hole. The monitor body has a latching protrusion engaged with the latching slot of the rotatable portion. The screw corresponds to the screw hole for locking the latching protrusion in the latching slot of the rotatable portion.

4 Claims, 3 Drawing Sheets

MONITOR AND SUPPORTING MECHANISM FOR THE SAME

TECHNICAL FIELD

The present invention relates to monitors, and particularly to a monitor that can be conveniently assembled and disassembled.

DESCRIPTION OF THE RELATED ART

A typical monitor includes a monitor body capable of displaying information thereon and a base member to support the monitor body. Herein, a typical monitor body refers to thin plate shaped (display) panel, such as an LCD (liquid crystal display) or a PDP (plasma display panel). In order to secure the monitor body to the base member, a number of connecting structures have been designed. However, most of these connecting structures are complex, and as a result, it is usually difficult to assemble the monitor body to the base member or disassemble the monitor body from the base member.

What is needed, therefore, is a monitor that can be conveniently assembled and disassembled to overcome the above-described problem.

BRIEF DESCRIPTION OF THE DRAWINGS

Many aspects of the present monitor can be better understood with references to the accompanying drawings. The components in the drawings are not necessarily drawn to scale, the emphasis instead being placed upon clearly illustrating the principles of the present monitor.

DETAILED DESCRIPTION OF THE EMBODIMENTS

Embodiments of the present invention will now be described in detail below, with references to the accompanying drawings.

Figure 1:
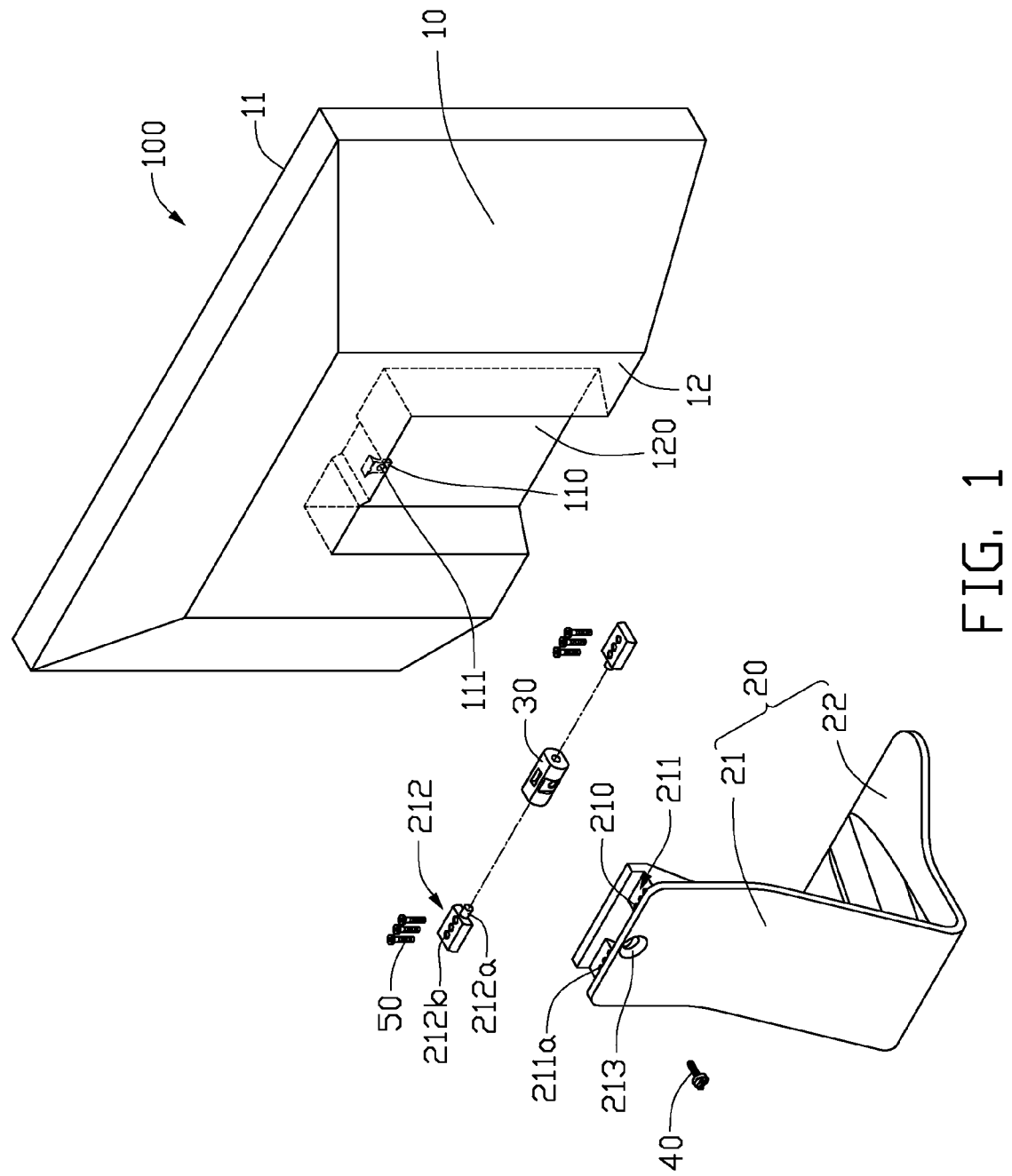
FIG. 1 is an exploded schematic view of a monitor according to an exemplary embodiment.
Figure 2:
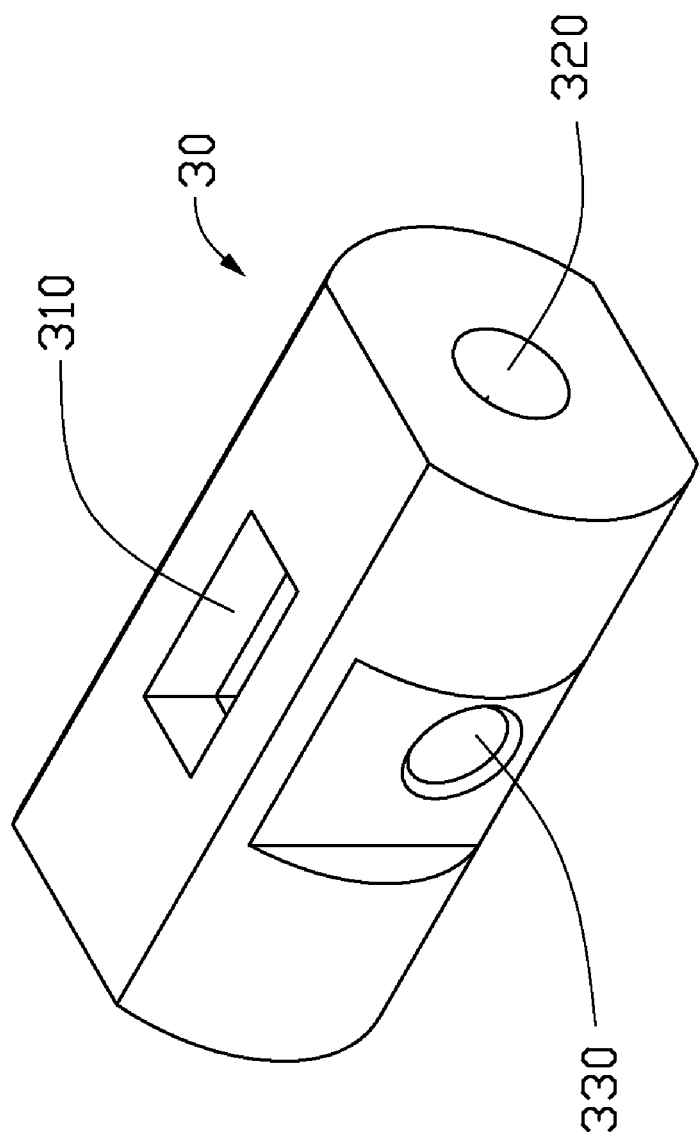
FIG. 2 is a schematic view of a rotatable portion of the monitor of FIG. 1.
Figure 3:
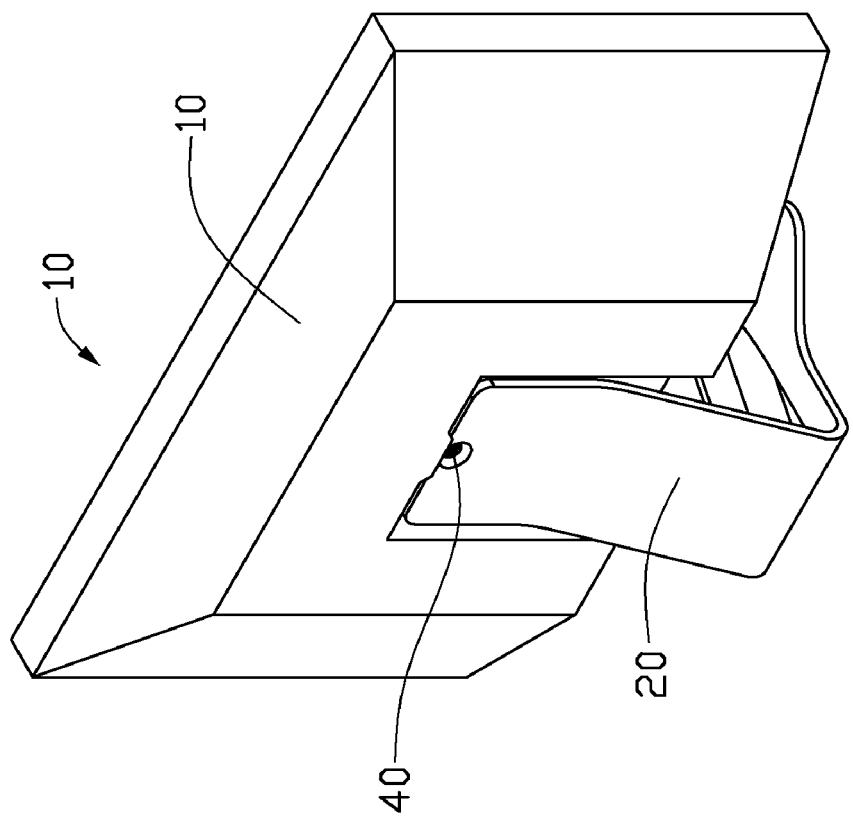
FIG. 3 is a schematic view of the monitor of FIG. 1 after being assembled according to the exemplary embodiment.

Referring to FIGS. 1 to 3, a monitor 100 according to an exemplary embodiment is shown. The monitor 100 includes a monitor body 10 having a front side 11 with a screen (not shown) located thereon and a back side 12 opposite to the front side 11, a base member 20 and a rotatable portion 30.

The base member 20 includes a horizontal base plate portion 22 and an upright portion 21 extending upwardly from the base plate portion 22. In the present embodiment, the upright portion 21 extends from an end of the base plate portion 20 that is furthest from the front side 11 of the monitor body 10. The upright portion 21 and the base plate portion 22 collectively define an acute angle therebetween. The upright portion 21 and the base plate portion 22 can be formed integrally.

The upright portion 21 has a mounting end 210 furthest from the base plate portion 22. The monitor body 10 is pivotably connected to the mounting end 210 of the upright portion 21. The upright portion 21 defines a receiving slot 211 at the mounting end 210 thereof. Two connecting portions 212 are secured in the receiving slot 211 and located at two ends of the receiving slot 211, respectively. Each connecting portion 212 includes a shaft 212a extending towards each other. In the present embodiment, the bottom of the receiving slot 211 defines several screw holes 211a and the connecting portions 212 defines a number of screw holes 212b corresponding to the screw holes 211a. The two connecting portions 212 are secured in the receiving slot 211 by screws 50. A side wall of the receiving slot 211 furthest from the monitor body 10 defines a through hole 213.

The rotatable portion 30 is received in the receiving slot 211 and located between the two connecting portions 212. The rotatable portion 30 defines a longitudinal through hole 320 corresponding to the shafts 212a of the connecting portions 212, a screw hole 330 corresponding to the through hole 213, and a latching slot 310 communicated with the screw hole 330. The two shafts 212a of the connecting portions 212 are capable of engaging in the longitudinal through hole 320, thus, the rotatable portion 30 can rotate relative to the connecting portion 212. In order to assemble the rotatable portion 30 into the receiving slot 211, the rotatable portion 30 should first be assembled with the two connecting portions 212. After inserting the shafts 212a of the connecting portions 212 into the longitudinal through hole 320 of the rotatable portion 30, the rotatable portion 30 and the connecting portions 212 can be mounted into the receiving slot 211 together, subsequently securing the connecting portions 212 by screws 50. The longitudinal through hole 320 of the rotatable portion 30 can also be replaced by two blind longitudinal holes defined at two ends of the rotatable portion 30.

The monitor body 10 can be a flat panel display, for example a Liquid Crystal Display (LCD) monitor, an Organic Light Emitting Diode (OLED) monitor or a plasma display monitor. A latching protrusion 110 is located on the back side 12 of the monitor body 10 for latching in the latching slot 310 of the rotatable portion 30. In the present embodiment, the monitor body 10 defines a recess 120. The latching protrusion 110 is located on the top surface of the recess 120. In assembly, the latching protrusion 110 of the monitor body 10 is inserted into the latching slot 310 of the rotatable portion 30 and is locked by a screw 40. As a result, the monitor body 10 is secured to the rotatable portion 30 and the monitor body 10 can be rotated together with the rotatable portion 30.

In the present embodiment, the monitor body 10 can be assembled to the base member 20 conveniently. In order to assemble the monitor body 10 to the base member 20, the latching protrusion 110 must be inserted into the latching slot 310 of the rotatable portion 30 and then locked by the screw 40. The monitor body 10 can also be disassembled from the base member 20 conveniently by loosening the screw 40 and removing the latching protrusion 110 from the latching slot 310. In the present embodiment, the inner diameter of the longitudinal through hole 320 is substantially equal to that of the outer diameter of the two shafts 212a, thus, the longitudinal through hole 320 of the rotatable portion 30 can be tightly fitted with the two shafts 212a. As a result, the friction force between the shaft 212a and the wall of the longitudinal through hole 320 can hold the monitor body 10 with any title angle relative to the base member 20.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A monitor comprising:

a base member comprising a mounting end;

a rotatable portion rotatably assembled on the mounting end, the rotatable portion defining a latching slot and a screw hole communicating with the latching slot;

a monitor body comprising a latching protrusion engaging with the latching slot of the rotatable portion, the latching protrusion being fixed relative to the monitor body; and a screw corresponding to the screw hole for fixing the latching protrusion in the latching slot of the rotatable portion;

wherein the base member comprises a horizontal base plate portion and an upright portion extending upwardly from the base plate portion, the mounting end is located on the upright portion at a distal end from the base plate; wherein the upright portion extends from an end of the base plate portion furthest away from the front side of the monitor body, the upright portion and the base plate portion define an acute angle.

2. The monitor as claimed in claim 1, wherein the upright portion and the base plate portion are formed integrally.

3. A supporting mechanism for a monitor body with a latching protrusion fixed relative to the monitor body, the supporting mechanism comprising:

a base member comprising a mounting end;

a rotatable portion rotatably assembled on the mounting end, the rotatable portion defining a latching slot for latching with the latching protrusion fixed relative to the monitor body and a screw hole communicating with the latching slot; and a screw corresponding to the screw hole for fixing the latching protrusion of the monitor body in the latching slot of the rotatable portion;

wherein the base member comprises a horizontal base plate portion and an upright portion extending upwardly from the base plate portion, the mounting end is located on the upright portion furthest from the base plate portion;

wherein the upright portion extends from an end of the base plate portion furthest away from the front side of the monitor body, the upright portion and the base plate portion define an acute angle.

4. The supporting mechanism as claimed in claim 3, wherein the upright portion and the base plate portion are formed integrally.

* * * * *